United States Patent
Delannoy

(10) Patent No.: US 7,996,120 B2
(45) Date of Patent: Aug. 9, 2011

(54) METHOD AND DEVICE FOR FLYING AN AIRCRAFT ACCORDING TO AT LEAST ONE FLYING LINE

(75) Inventor: Stéphane Delannoy, Pujaudran (FR)

(73) Assignee: Airbus France, Toulouse (FR)

(\*) Notice: Subject to any disclaimer, the term of this patent is extended or adjusted under 35 U.S.C. 154(b) by 771 days.

(21) Appl. No.: 11/996,339

(22) PCT Filed: Jul. 17, 2006

(86) PCT No.: PCT/FR2006/001740
§ 371 (c)(1),
(2), (4) Date: Jan. 21, 2008

(87) PCT Pub. No.: WO2007/012728
PCT Pub. Date: Feb. 1, 2007

(65) Prior Publication Data
US 2008/0167761 A1 Jul. 10, 2008

(30) Foreign Application Priority Data
Jul. 28, 2005 (FR) ..................... 05 08053

(51) Int. Cl.
*B60W 40/10* (2006.01)
*G06F 17/11* (2006.01)

(52) U.S. Cl. ............... 701/8; 701/9; 244/177; 244/221; 318/632

(58) Field of Classification Search ............... 701/3
See application file for complete search history.

(56) References Cited

U.S. PATENT DOCUMENTS

| 4,298,833 | A | 11/1981 | Edwards | |
|---|---|---|---|---|
| 4,741,501 | A | * 5/1988 | Clelford et al. | 244/17.13 |
| 5,125,602 | A | * 6/1992 | Vauvelle | 244/223 |
| 5,528,119 | A | * 6/1996 | Rundqwist et al. | 318/632 |
| 5,935,177 | A | * 8/1999 | Cox et al. | 701/9 |
| 7,357,357 | B2 | * 4/2008 | Giazotto | 244/183 |
| 2003/0183728 | A1 | * 10/2003 | Huynh | 244/224 |
| 2004/0078120 | A1 | * 4/2004 | Melkers et al. | 701/3 |
| 2004/0098176 | A1 | * 5/2004 | Raimbault et al. | 701/3 |
| 2005/0021193 | A1 | 1/2005 | Raimbault | |

FOREIGN PATENT DOCUMENTS

| FR | 2 847 352 | 5/2004 |
|---|---|---|
| GB | 1 579 339 | 11/1980 |

OTHER PUBLICATIONS

International Search Report dated Apr. 5, 2007.
Written Opinion of the ISA dated Apr. 5, 2007, w/ English translation.

* cited by examiner

*Primary Examiner* — Thomas G Black
*Assistant Examiner* — Lin B Olsen
(74) *Attorney, Agent, or Firm* — Dickinson Wright PLLC

(57) ABSTRACT

The device for flying an aircraft includes a first unit for determining a control value corresponding to an instruction value representing the actuation of a control member by a pilot, a second unit for determining an effective control value corresponding to the instruction value which is actually applied to the aircraft, a third unit for automatically controlling the aircraft, a fourth unit for computing an auxiliary control value, which is closer to the effective controlled value, and a fifth unit for monitoring the control value and for detecting a pilot induced oscillation, where the automatic control is carried out with the aid of the controlled effective value and the auxiliary control value in the case of the detection of the pilot induced oscillation.

10 Claims, 2 Drawing Sheets

METHOD AND DEVICE FOR FLYING AN AIRCRAFT ACCORDING TO AT LEAST ONE FLYING LINE

Figure 1:
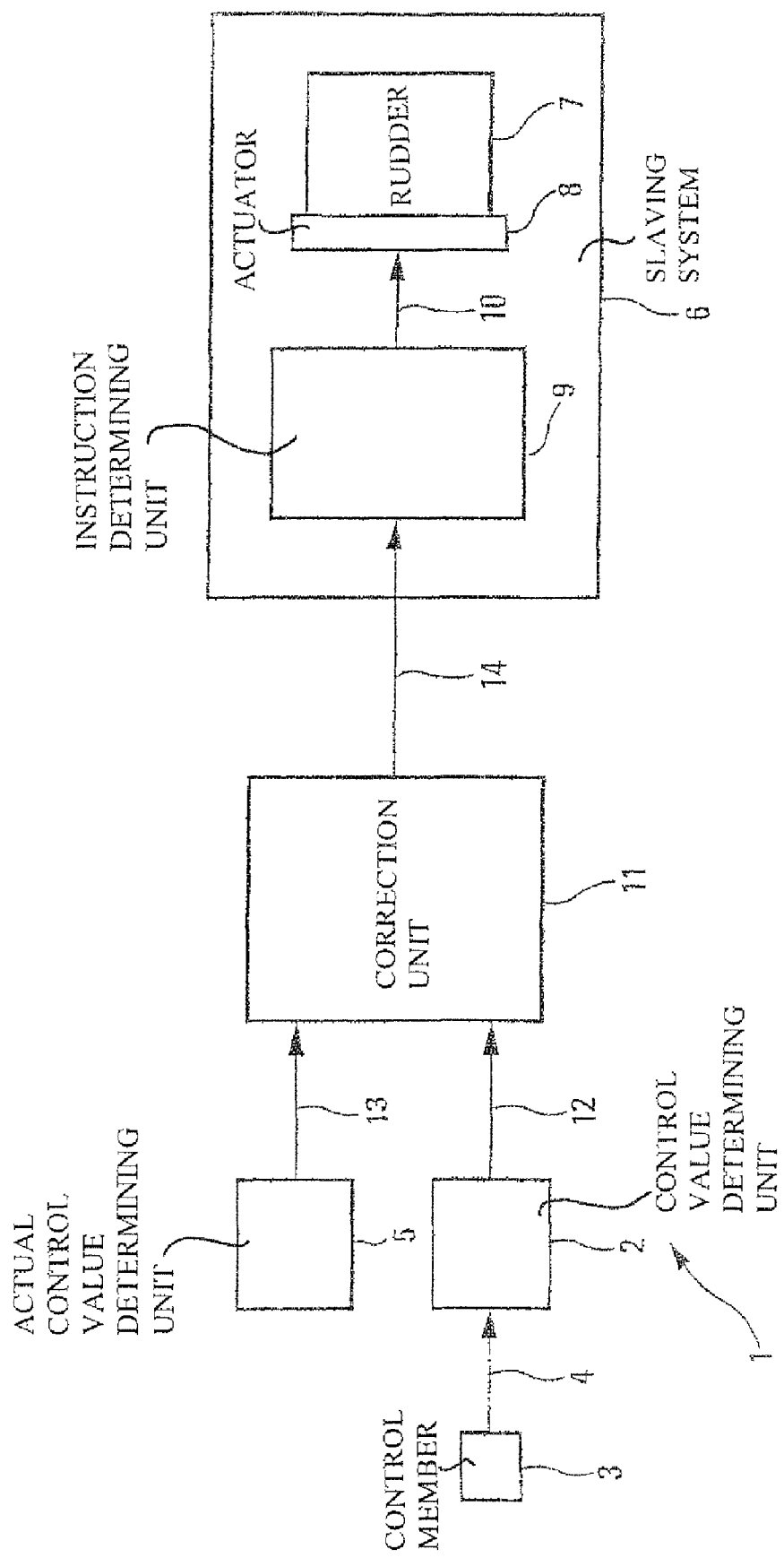

The present invention relates to a method and a device for piloting an aircraft, for example a transport airplane, according to at least one piloting axis (namely the roll, yaw and/or pitch axis).

It is known that during manual piloting of an airplane, the pilot may unintentionally couple with the airplane at the frequencies of the natural modes of said airplane. This coupling can become unstable and give rise to undamped oscillating instructions of the pilot. Such a situation can arise in particular if the pilot gain is unsuitable (too high) for the capabilities of the air-lane, related to its inertia and to the performance of its various actuators. If the airplane responds belatedly to the pilot, the latter generally increases his gain, which causes the system to approach instability, further increasing the misphase between the instruction representative of the pilot's order and the instruction actually applied to the airplane.

An unchecked oscillatory motion of an airplane, resulting from such a critical misphase between the action of the pilot on the controls and the response of the airplane, is called "Pilot Induced Oscillation" PIO.

The object of the present invention is to remedy these drawbacks. It relates to a method of piloting an aircraft, in particular an airplane, according to at least one piloting axis of said aircraft, which makes it possible to prevent the appearance of the aforesaid unstable coupling according to said piloting axis and thus to preserve particularly stable piloting.

For this purpose, according to the invention, said method according to which:

A/ a control value is determined which corresponds to the value of a piloting instruction relating to said piloting axis, said value being representative of the actuation of at least one control member of the aircraft, by a pilot of said aircraft;

B/ an actual controlled value is determined which corresponds to the value of said piloting instruction, actually applied to the aircraft; and C/ a slaving of the aircraft relating to said piloting instruction is effected with the aid of said control value and of said actually controlled value by applying to the aircraft an instruction making it possible to zero, if appropriate, the difference between said control value and said actual controlled value, is noteworthy in that:

an auxiliary control value which is closer to said actual controlled value than said control value is calculated on the basis of said control value and of said actual controlled value;

a monitoring of said control value making it possible to detect a pilot induced oscillation is effected; and in the event that a pilot induced oscillation is detected, the slaving in step C/ is effected with the aid of said actual controlled value and of said auxiliary control value.

Thus, by virtue of the invention, a corrective action is effected right from the appearance of a pilot induced oscillation, thereby making it possible to prevent the installation of an unstable coupling of the aforesaid type and therefore to preserve particularly stable piloting.

It will be noted that by calculating an auxiliary control value and by applying this auxiliary control value to the slaving when a pilot induced oscillation is detected, the misphase between the control value used and the actual controlled value is reduced since said calculated auxiliary control value is (by definition) closer to said actual controlled value than to said control value (direct instruction of the pilot).

Reduction of this misphase thus prevents the appearance of the aforesaid instability.

Furthermore, as said auxiliary control value is determined in particular on the basis of said control value and therefore takes account of the instruction controlled by the pilot, the correction introduced by the piloting method in accordance with the invention does not disturb (at least not excessively) the piloting of the aircraft.

In a preferred embodiment, said piloting axis corresponds to the roll piloting axis and said piloting instruction represents a roll rate.

In this case, advantageously, to calculate said auxiliary control value:

a value $\Delta P$ dependent on said control value P representing a roll rate is determined;

the product of this value $\Delta P$ and of said actual controlled value $\underline{p}$ representing an actual controlled roll rate is calculated; and on the basis of this calculation:

if this product is greater than zero, the auxiliary control value Paux representing an auxiliary roll rate is calculated with the aid of the following expression:

$$Paux = \frac{(K \cdot T \cdot s)}{T \cdot s + 1} \cdot \Delta P + p$$

in which:

K represents a predetermined gain value;

T represents a predetermined time constant; and s represents a characteristic variable of a Laplace transformation; and if this product is less than zero, the auxiliary control value Paux representing an auxiliary roll rate is calculated with the aid of the following expression:

$$Paux = \frac{(K \cdot T \cdot s)}{T \cdot s + 1} \cdot \Delta P$$

Preferably, in this case, said value $\Delta P$ is determined with the aid of the following expression:

$\Delta P = P/5$.

Thus, the method in accordance with the invention does not hinder piloting when a pilot induced oscillation is absent and does not significantly reduce the handleability of the aircraft in this case.

The present invention therefore minimizes the misphase between the control value (control roll rate for example) and the actual controlled value (actual controlled roll rate for example), by a nonlinear action on said control value, by way of the generation and application of said auxiliary control value.

Advantageously, a pilot induced oscillation is detected when one of the following two conditions is satisfied:

the control value P representing a roll rate successively exceeds +NIVPIO, −NIVPIO and +NIVPIO at a frequency lying between two predetermined frequencies, NIVPIO representing a predetermined value;

said control value P representing a roll rate successively exceeds −NIVPIO, +NIVPIO and −NIVPIO at a frequency lying between said two predetermined frequencies.

Furthermore, in an advantageous manner, a slaving on the auxiliary control value is engaged over a first predetermined duration and stops completely after a second predetermined duration.

Additionally, in another embodiment, said piloting axis can also correspond to the pitch piloting axis or to the yaw piloting axis of said aircraft.

The present invention also relates to a device for piloting an aircraft, in particular a transport airplane, according to at least one piloting axis (roll, yaw, pitch).

According to the invention, said device of the type comprising:

first means for determining a control value which corresponds to the value of a piloting instruction relating to said piloting axis, this value being representative of the actuation of at least one control member of the aircraft by a pilot of said aircraft;

second means for determining an actual controlled value which corresponds to the value of said piloting instruction, actually applied to the aircraft; and third means for effecting, with the aid of said control value and of said actual controlled value, a slaving of the aircraft relating to said piloting instruction, by applying to the aircraft an instruction making it possible to zero if appropriate the difference between said control value and said actual controlled value, is noteworthy in that:

said device moreover comprises:

fourth means for calculating, on the basis of said control value and of said actual controlled value, an auxiliary control value which is closer to said actual controlled value than said control value; and a fifth means for effecting a monitoring of said control value, making it possible to detect a pilot induced oscillation; and said third means are formed so as to effect the slaving with the aid of said actual controlled value and of said auxiliary control value, in the event that said fifth means detect a pilot induced oscillation.

The figures of the appended drawing elucidate the manner in which the invention may be embodied. In these figures, identical references designate similar elements.

FIG. 1 is the schematic diagram of a device in accordance with the invention.

Figure 2:
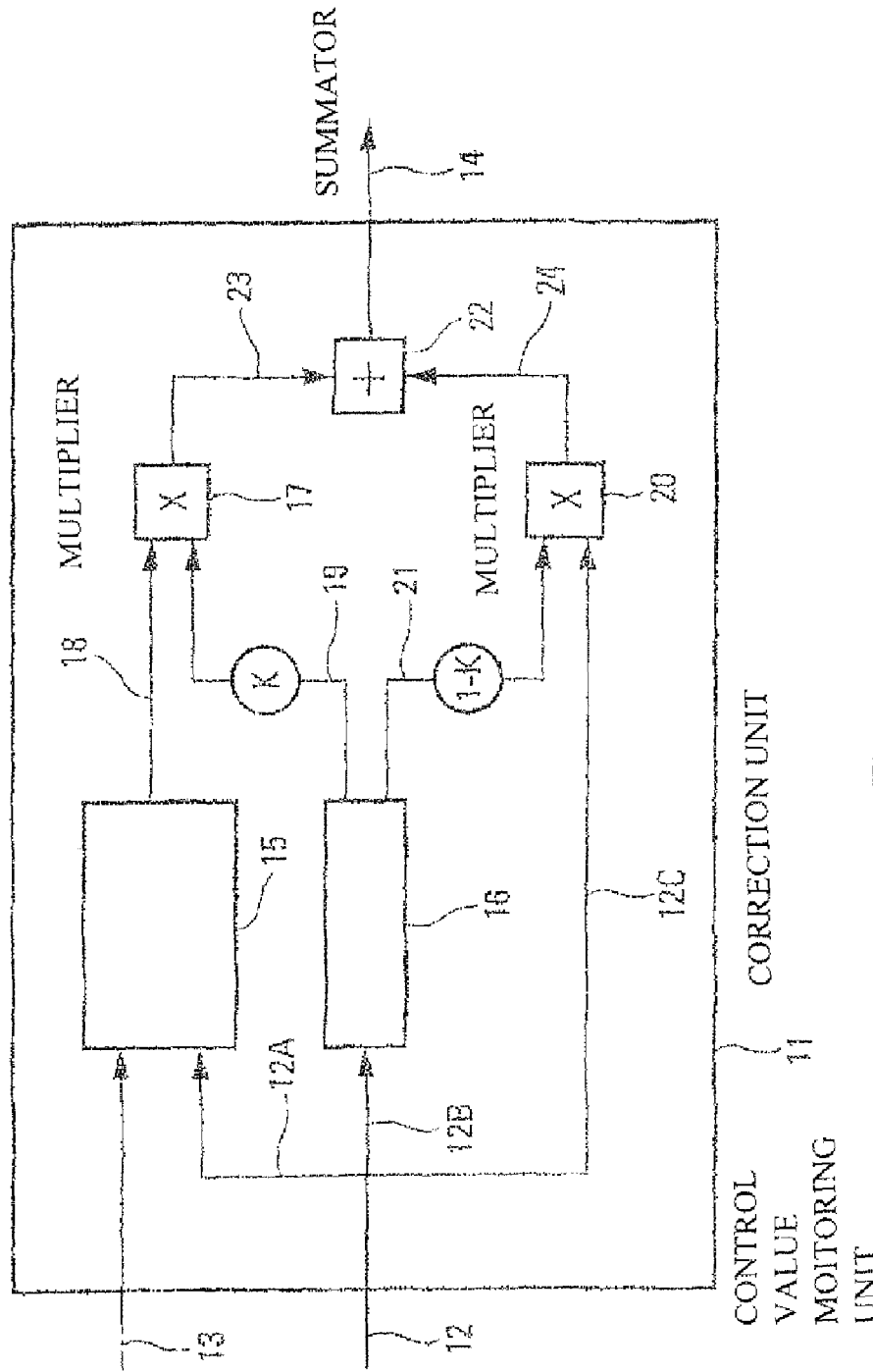

FIG. 2 schematically shows a particular embodiment of means of a device in accordance with the invention.

The device 1 in accordance with the invention and schematically represented in FIG. 1, is a piloting device (with electric controls) of an aircraft, not represented, in particular of a civil transport airplane.

Said device 1 is of the type comprising:

means 2 told determining a control value which corresponds to the value of a piloting instruction relating to at least one particular piloting axis of said aircraft, for example the roll, pitch and/or yaw axis. The value of this piloting instruction is representative of the actuation of at least one standard control member 3 of the aircraft by a pilot of said aircraft. Said means 2 are formed so as to be able to measure the amplitude of the actuation of said control member 3, for example a ministick, as illustrated by a chain dotted link 4 in FIG. 1;

means 5 for determining an actual controlled value which corresponds to the value of said piloting instruction (according to said chosen piloting axis) which is actually applied to the aircraft, and a slaving system 6 which is formed so as to effect, with the aid of the control value received from said means 2 and of the actual controlled value received from said means 5, a slaving of the aircraft relating to said piloting instruction, by applying to this aircraft an instruction making it possible to zero if appropriate the difference between said control value and said actual controlled value.

Accordingly, said slaving system 6 comprises, in a standard manner:

at least one rudder 7 which is capable of acting on the chosen piloting axis of the aircraft and which is controlled by at least one actuator 8; and means 9 which determine an instruction making it possible to zero the difference between the control value and the actual controlled value and which transmit this instruction to the actuator 8 of the rudder 7 by way of a link 10.

According to the invention, the device 1 comprises, moreover, a correction unit 11 which is connected by way of links 12, 13 and 14 respectively to said means 2, 5 and 6 and which comprises, as represented in FIG. 2:

means 15 for calculating, on the basis on the one hand of the control value received from said means 2 (by way of a link 12A connected to said link 12) and on the other hand of said actual controlled value received from said means 5 (by way of the link 13), an auxiliary control value which is, by definition, closer to said actual controlled value than said control value; and means 16 specified below, for effecting a monitoring of said control value received from said means 2 by way of a link 12B connected to said link 12. This monitoring is effected so as to make it possible to detect any pilot induced oscillation, that is to say any unchecked oscillatory motion of the aircraft resulting from a critical misphase between the action of the pilot on the control member 3 and the response of the aircraft to this action.

Moreover, according to the invention said means 9 of the slaving unit 6 are formed so as to effect the slaving with the aid of said actual controlled value (determined by said means 5) and of said auxiliary control value (calculated by said means 15), in the event that a pilot induced oscillation is detected by said means 16.

Thus, the device 1 in accordance with the invention effects a corrective action right from the appearance of a pilot induced oscillation, thereby making it possible to prevent the installation of an unstable coupling of the aforesaid type and therefore to preserve particularly stable piloting.

It will be noted that by calculating an auxiliary control value and by applying this auxiliary control value to the slaving during the detection of a pilot induced oscillation, the correction unit 11 and the slaving unit 6 reduce the misphase between the control value used and the actual controlled value, since said calculated auxiliary control value is (by definition) closer to said actual controlled value than to said control value (direct instruction of the pilot).

Reduction of this misphase thus prevents the appearance of the aforesaid instability.

Furthermore, as said auxiliary control value is determined (by said means 15) in particular on the basis of said control value and therefore takes account of the instruction controlled by the pilot (by actuating the control member 3), the correction introduced by the device 1 in accordance with the invention does not disturb (at least not excessively) the piloting of the aircraft.

Within the framework of the present invention, said piloting axis can be a roll axis, a pitch axis or a yaw axis. Moreover, it is also conceivable for the device 1 in accordance with the invention to be able to effect the aforesaid correction simultaneously according to several of these piloting axes.

For (nonlimiting) illustrative purposes, a particular embodiment of the invention relating to piloting according to a roll piloting axis is presented hereinafter. In this case, the aforesaid piloting instruction represents a roll rate expressed in degrees per second.

Moreover, in this case, to calculate said auxiliary control value, said means 15:

determine a value ΔP dependent on said control value P representing a roll rate;

calculate the product of this value ΔP and of said actual controlled value p representing an actual controlled role rate; and on the basis of this calculation:

if this product is greater than zero, calculate the auxiliary control value Paux representing an auxiliary roll rate, with the aid of the following expression:

$$Paux = \frac{(K \cdot T \cdot s)}{T \cdot s + 1} \cdot \Delta P + p$$

in which:

K represents a predetermined gain value;

T represents a predetermined time constant; and s represents a characteristic variable of a Laplace transformation; and if this product is less than zero, calculate the auxiliary control value Paux representing an auxiliary roll rate, with the aid of the following expression:

$$Paux = \frac{(K \cdot T \cdot s)}{T \cdot s + 1} \cdot \Delta P$$

Preferably, in this case, said means 15 determine said value ΔP, with the aid of the following expression: ΔP=P/5.

Thus, the device 1 in accordance with the invention does not hinder piloting when a pilot induced oscillation is absent and does not significantly reduce the handleability of the aircraft in this case.

The present invention therefore minimizes the misphase between the control value (control roll rate P for example) and the actual controlled value (actual controlled roll rate p for example), by a nonlinear action on said control value, by way of the generation and application of said auxiliary control value (auxiliary roll rate Paux for example).

Furthermore, according to the invention, said means 16 detect a pilot induced oscillation on the basis of the monitoring of the control value P arising from said means 2. More precisely, said means 16 detect a pilot induced oscillation, when one of the following two conditions is satisfied:

the control value P representing a roll rate successively exceeds +NIVPIO, −NIVPIO and +NIVPIO at a frequency lying between two predetermined frequencies f1 (f1=0.125 Hz for example) and f2 (f2=0.5 Hz for example). NIVPIO represents a predetermined value of the graduation of the control member 3 in such a manner that any induced oscillation causes the means 16 to detect the pilot induced oscillation only if the control member 3 is deflected by a value greater than NIVPIO;

said control value P representing a roll rate successively exceeds −NIVPIO, +NIVPIO and −NIVPIO at a frequency lying between said two aforesaid frequencies f1 and f2.

Of course, so long as the control value P continues to toggle from +NIVPIO to −NIVPIO, pilot induced oscillation is detected.

In the particular embodiment represented in FIG. 2, the correction unit 11 moreover comprises:

a multiplier 17 which multiplies the auxiliary control value Paux (received from said means 15 by way of a link 18) by a parameter K received from said means 16 by way of a link 19;

a multiplier 20 which multiplies the control value P (received from said means 2 by way of a link 12C connected to said link 12) by a coefficient (1−K) received from said means 16 by way of a link 21; and a summator 22 which is connected by way of links 23 and 24 respectively to said multipliers 17 and 20 and which computes the sum of the multiplications effected by these multipliers 17 and 20 and which transmits this sum by way of the link 14.

In this case, said means 16 are formed so as to transmit:

a zero value K, when said means 16 do not detect any pilot induced oscillation so that the value which is then transmitted by the link 14 and which is used by the means 9 for effecting the slaving corresponds to the control value P representative of the actuation of the control member 3 by the pilot; and a value K equal to 1, when said means 16 detect a pilot induced oscillation so that the value which is transmitted by way of the link 14, then corresponds to the auxiliary control value Paux. In this case, the means 9 therefore effect the slaving on the basis of this auxiliary control value Paux so that the correction law in accordance with the invention is then active.

The correction law in accordance with the invention is engaged for a predetermined duration T1 (time to toggle K from 0 to 1) and stops completely after a predetermined duration T2 (time to toggle K from 1 to 0). The durations T1 and T2 are fixed so as to avoid disturbing the piloting, during the activations and deactivations of the correction law.

The invention claimed is:

1. A method of piloting an aircraft according to at least one piloting axis of said aircraft, the method comprising:

determining a control value which corresponds to a value of a piloting instruction relating to said piloting axis, said value being representative of an actuation of at least one control member of the aircraft, by a pilot of said aircraft;

determining an actual controlled value which corresponds to a value of said piloting instruction, actually applied to the aircraft; and effecting a slaving of the aircraft relating to said piloting instruction, with the aid of said control value and of said actual controlled value, by applying to the aircraft an instruction to zero, if appropriate, the difference between said control value and said actual controlled value, wherein the method further comprises:

calculating an auxiliary control value which is closer to said actual controlled value than said control value on the basis of said control value and of said actual controlled value;

effecting a monitoring of said control value to detect a pilot induced oscillation; and in the event that the pilot induced oscillation is detected, performing the effecting of the slaving with the aid of said actual controlled value and of said auxiliary control value.

2. The method as claimed in claim 1 wherein said piloting axis corresponds to a roll piloting axis and said piloting instruction represents a roll rate.

3. The method as claimed in claim 2 wherein the calculating of said auxiliary control value comprises:

determining a value ΔP dependent on said control value P representing a roll rate;

calculating a product of the value ΔP and of the actual controlled value p representing an actual controlled roll rate; and on the basis of the calculating of the product:
if the product of the value ΔP and of the actual controlled value p is greater than zero, the auxiliary control value Paux representing an auxiliary roll rate is calculated with the aid of the following expression:

$$Paux = \frac{(K \cdot T \cdot s)}{T \cdot s + 1} \cdot \Delta P + p$$

in which:
K represents a predetermined gain value;
T represents a predetermined time constant; and
s represents a characteristic variable of a Laplace transformation; and
if the product of the value ΔP and of the actual controlled value p is less than zero, the auxiliary control value Paux representing the auxiliary roll rate is calculated with the aid of the following expression:

$$Paux = \frac{(K \cdot T \cdot s)}{T \cdot s + 1} \cdot \Delta P.$$

4. The method as claimed in claim 3 wherein said value ΔP is determined with the aid of the following expression:

ΔP=P/5.

5. The method as claimed in claim 2 wherein the pilot induced oscillation is detected when one of the following two conditions is satisfied:
the control value P representing a roll rate successively exceeds ±NIVPIO, −NIVPIO and +NIVPIO at a frequency lying between two predetermined frequencies, NIVPIO representing a predetermined value; and
said control value P successively exceeds −NIVPIO, +NIVPIO and −NIVPIO at a frequency lying between said two predetermined frequencies.

6. The method as claimed in claim 1 wherein a slaving of the aircraft based on the auxiliary control value is engaged over a first predetermined duration and stops completely after a second predetermined duration.

7. The method as claimed in claim 1 wherein said piloting axis corresponds to a pitch piloting axis.

8. The method as claimed in claim 1 wherein said piloting axis corresponds to a yaw piloting axis.

9. A device for piloting an aircraft according to at least one piloting axis, said device comprising:
a first unit for determining a control value which corresponds to a value of a piloting instruction relating to said piloting axis, the value being representative of the actuation of at least one control member of the aircraft by a pilot of said aircraft;
a second unit for determining an actual controlled value which corresponds to a value of said piloting instruction, actually applied to the aircraft; and
a third unit for effecting, with the aid of said control value and of said actual controlled value, a slaving of the aircraft relating to said piloting instruction, by applying to the aircraft an instruction to zero if appropriate the difference between said control value and said actual controlled value,
wherein
said device moreover comprises:
a fourth unit for calculating, on the basis of said control value and of said actual controlled value, an auxiliary control value which is closer to said actual controlled value than said control value; and
a fifth unit for effecting a monitoring of said control value, to detect a pilot induced oscillation; and
said third unit is configured so as to effect the slaving with the aid of said actual controlled value and of said auxiliary control value, in the event that said fifth unit detects the pilot induced oscillation.

10. An aircraft comprising the device of claim 9.

* * * * *